United States Patent
Ha et al.

(10) Patent No.: US 10,633,056 B2
(45) Date of Patent: Apr. 28, 2020

(54) BICYCLE WITH AUTOMATIC TRANSMISSION

(71) Applicants: Min Soo Ha, Whittier, CA (US); Jinsu Ha, Namyangju-si (KR); Tae Hong Ha, Seoul (KR)

(72) Inventors: Min Soo Ha, Whittier, CA (US); Jinsu Ha, Namyangju-si (KR); Tae Hong Ha, Seoul (KR)

(73) Assignee: Tae Hong Ha, Seoul (KR)

( * ) Notice: Subject to any disclaimer, the term of this patent is extended or adjusted under 35 U.S.C. 154(b) by 44 days.

(21) Appl. No.: 15/946,267

(22) Filed: Apr. 5, 2018

(65) Prior Publication Data

US 2018/0297666 A1    Oct. 18, 2018

(30) Foreign Application Priority Data

Apr. 12, 2017  (KR) .................. 10-2017-0047280
Apr. 12, 2017  (KR) .................. 10-2017-0047281

(51) Int. Cl.

| B62M 11/16 | (2006.01) |
|---|---|
| F16H 3/54 | (2006.01) |
| F16H 37/04 | (2006.01) |
| B62M 9/02 | (2006.01) |

(52) U.S. Cl.
CPC ............ *B62M 11/16* (2013.01); *B62M 9/02* (2013.01); *F16H 3/54* (2013.01); *F16H 37/04* (2013.01); *F16H 2200/2005* (2013.01); *F16H 2200/2035* (2013.01); *F16H 2200/2064* (2013.01); *F16H 2200/2094* (2013.01)

(58) Field of Classification Search
CPC . B62M 9/02; B62M 11/16; F16H 3/54; F16H 37/04; F16H 2200/2005; F16H 2200/2035; F16H 2200/2064; F16H 2200/2094
USPC ........................................................ 475/210
See application file for complete search history.

(56) References Cited

U.S. PATENT DOCUMENTS

| 5,121,936 A * | 6/1992 | Cowan ................. B62M 11/145 280/236 |
|---|---|---|
| 6,120,409 A * | 9/2000 | Hawkins ................... F16H 3/64 475/275 |
| 6,241,636 B1 * | 6/2001 | Miller .................... B62K 3/002 476/36 |
| 6,267,704 B1 * | 7/2001 | Patterson ............... B62M 11/16 475/298 |
| 6,354,980 B1 * | 3/2002 | Grant .................... B62M 11/16 280/238 |
| 6,390,487 B1 * | 5/2002 | Yoo ........................ B62M 11/16 280/237 |
| 6,478,711 B2 * | 11/2002 | Yoo ........................ B62M 11/16 475/289 |
| 8,167,768 B2 * | 5/2012 | Hartmann .............. B62M 11/16 475/296 |
| 8,235,859 B2 * | 8/2012 | Yun ........................ B62M 11/06 475/290 |

(Continued)

FOREIGN PATENT DOCUMENTS

KR    10-0983985 B1    9/2010

*Primary Examiner* — Leslie A Nicholson, III
(74) *Attorney, Agent, or Firm* — Rabin & Berdo, P.C.

(57) ABSTRACT

Provided is a bicycle with an automatic transmission, and more particularly, a bicycle with an automatic transmission for enabling rapid and smooth gearshifting from a low speed to a high speed or from a high speed to a low speed.

7 Claims, 11 Drawing Sheets

(56) References Cited

U.S. PATENT DOCUMENTS

| | | | |
|---|---|---|---|
| 8,388,490 B2 * | 3/2013 | Su | B62M 11/16 |
| | | | 475/300 |
| 8,435,155 B2 * | 5/2013 | Gobel | B62M 11/14 |
| | | | 475/297 |
| 10,226,997 B2 * | 3/2019 | Huang | B60K 17/145 |
| 2019/0144073 A1 * | 5/2019 | Kim | F16H 63/18 |

* cited by examiner

BICYCLE WITH AUTOMATIC TRANSMISSION

BACKGROUND OF THE INVENTION

Field of the Invention

The present invention relates to a bicycle with an automatic transmission, and more particularly to a bicycle with an automatic transmission for enabling rapid and smooth gearshifting from a low speed to a high speed or from a high speed to a low speed.

Description of the Related Art

In general, a bicycle is configured such that a crankshaft between a pedal shaft and a pedal has a fixed constant distance, and provides traveling force only from the driving force of the pedal coupled to the crankshaft.

In such a bicycle, since the rotational force of the pedal from the pedal shaft acts only within a predetermined rotational radius range, needless to say, greater driving energy is particularly required on an uphill road.

In order to solve this problem, a gearshift is installed and widely used to maximize traveling energy in a more reasonable manner.

Korean Patent Registration Publication No. 10-0983985 (2010 Sep. 27) discloses such a transmission for a bicycle.

However, the conventional bicycle transmission has difficulty in performing rapid and smooth gearshifting from a low speed to a high speed or from a high speed to a low speed.

RELATED ART DOCUMENT

Patent Document (Patent Document 0001) Korean Patent Registration Publication No. 10-0983985 (2010 Sep. 27) entitled "TRANSMISSION FOR BICYCLE"

SUMMARY OF THE INVENTION

Therefore, the present invention has been made in view of the above problems, and it is an object of the present invention to provide a bicycle with an automatic transmission for enabling rapid and smooth gearshifting from a low speed to a high speed or from a high speed to a low speed.

The object of the present invention to be solved is not limited to the object as mentioned above, and other unmentioned objects will be clearly understood by those skilled in the art from the following description.

In accordance with an aspect of the present invention, the above and other objects can be accomplished by the provision of a bicycle with an automatic transmission provided on a wheel to perform gearshifting, the automatic transmission including a shifting unit connected to the wheel to transmit a rotational force thereto and configured to perform gearshifting, a drive unit configured to be rotated by the rotational force transmitted from an outside, a connection unit configured to transmit the rotational force of the drive unit to the shifting unit, and a regulation unit configured to control the connection unit so as to cause the shifting unit to perform gearshifting.

The shifting unit may include a ring gear having an open side, a sun gear accommodated inside the ring gear, a drive shaft having one end connected to the sun gear and a remaining end penetrating a remaining side of the ring gear, and a plurality of planetary gears tooth-engaged between the ring gear and the sun gear, and the wheel may include a rotating shaft rotatably coupled at an outer periphery thereof to the ring gear, the sun gear, and the drive shaft, and a rotating plate provided around the rotating shaft so as to be disposed on one side of the wheel, and configured to transmit the rotational force to the wheel in cooperation with the rotating shaft, the rotating plate being provided with a plurality of rotating protrusions so that the planetary gears are rotatably coupled around the respective rotating protrusions.

The drive unit may include a driven pulley rotatably coupled around the drive shaft and connected to a driving pulley, which is connected to a pedal crank, via a belt, the connection unit may include a ring gear connector coupled to the drive shaft so as to be located on one side of the driven pulley and connected to the ring gear so as to be rotated together with the ring gear, and a sun gear connector coupled to the drive shaft so as to be located on a remaining side of the driven pulley and connected to the drive shaft so as to be rotated together with the sun gear, the regulation unit may control at least one of the ring gear connector and the sun gear connector to be rotated so as to enable gearshifting by rotation of at least one of the ring gear and the sun gear, and the shifting unit may shift to a first gear via rotation of the sun gear, may shift to a second gear via rotation of the ring gear, and may shift to a third gear via rotation of both the ring gear and the sun gear, so as to transmit the rotational force to the wheel.

The driven pulley may be formed with a one-side groove and an opposite-side groove, which are indented inward from opposite sides thereof and are formed respectively on inner circumferential surfaces thereof with one-side teeth and opposite-side teeth, the ring gear connector may include a fixing ring provided on the remaining side of the ring gear and formed on an outer circumferential surface thereof with a plurality of anti-rotation protrusions, an introduction ring configured to extend from an inner circumferential surface of the fixing ring in an opposite direction so as to be introduced into the one-side groove, a first rotator including a plurality of pawls pivotably coupled around the introduction ring and configured to cause the ring gear connector to be rotated together with the driven pulley when caught by the one-side teeth, or to prevent the ring gear connector from being rotated together with the driven pulley when released from the one-side teeth, and a first lock configured to cause the pawls to be folded or unfolded according to control of the regulation unit, and the sun gear connector may include a fixing ring provided on one side of the drive shaft and formed on an outer circumferential surface thereof with a plurality of anti-rotation protrusions, an introduction ring configured to extend from an inner circumferential surface of the fixing ring in an opposite direction so as to be introduced into the one-side groove, a second rotator including a plurality of pawls pivotably coupled around the introduction ring and configured to cause the sun gear connector to be rotated together with the driven pulley when caught by the opposite-side teeth, or to prevent the sun gear connector from being rotated together with the driven pulley when released from the opposite-side teeth, and a second lock configured to cause the pawls to be folded or unfolded according to control of the regulation unit.

Each of the first and second locks may include a disc ring coupled around a corresponding one of the introduction rings so as to come into contact with a corresponding one of the fixing rings and formed with pawl accommodating recesses, into which the respective pawls are accommodated in an unfolded state, and a plurality of locking protrusions configured to extend from an outer circumferential surface of the disc ring in a direction so as to surround the fixing ring, and, when the first or second rotator is rotated in an inward direction of the first or second lock and the pawls are discharged from the pawl accommodating recesses, the first or second lock may cause the pawls to be folded by coming into contact with an inner circumferential surface of the disc ring.

Each of the ring gear connector and the sun gear connector may further include an elastic ring, which includes one end connected to the first or second rotator and a remaining end connected to the first or second lock and which is configured to return to an original state thereof by rotation of the first or second rotator, each of the introduction rings may be formed in an inner circumferential surface thereof with a pair of guide grooves, and the disc ring is formed on the inner circumferential surface thereof with a pair of guide protrusions, which are introduced into the respective guide grooves, and each of the first and second locks may further include a pair of pressure members provided on the disc ring so as to be adjacent to the pawls and configured to apply pressure to the pawls when the first or second rotator is rotated in order to ensure smooth folding of the pawls.

The regulation unit may include a support frame disposed so as to be adjacent to the connection unit, a pair of stoppers pivotably connected to the support frame and configured to be caught by or released from the anti-rotation protrusions via pivoting thereof so as to cause the ring gear connector and the sun gear connector to be rotated together with the driven pulley or to prevent the ring gear connector and the sun gear connector from being rotated together with the driven pulley, and a regulator configured to regulate the pivoting of the stoppers.

The support frame may include an opposite-side plate located on one side of the connection unit and formed with a shaft coupling hole, into which the rotating shaft is coupled, an one-side plate disposed on the remaining side of the ring gear so as to face the opposite-side plate, and a connecting plate configured to interconnect the opposite-side plate and the one-side plate and disposed at an outer side of the ring gear connector and the sun gear connector, the regulation unit may further include a fixing pin connected to the opposite-side plate and the one-side plate so that the stoppers are pivotably connected to the fixing pin, and a spring provided between the stopper and the connecting plate, each of the stoppers may be formed on one end thereof with a holding protrusion that corresponds to the anti-rotation protrusions, a portion of the stopper between the one end and a remaining end is pivotably connected to the fixing pin so as to be adjacent to a corresponding one of the fixing rings, and the one end of the stopper pivots about the fixing pin as pressure is applied to the remaining end of the stopper by the regulator or as the applied pressure is released, so that the holding protrusion is caught by or released from the anti-rotation protrusions to enable control of rotation of the fixing ring, and, when the fixing ring of the ring gear connector or the sun gear connector is fixed, the introduction ring coupled therein may be rotated by a predetermined angle so that the pawls are folded and are released from the one-side teeth or the opposite-side teeth of the driven pulley, thereby preventing the ring gear connector or the sun gear connector from being rotated together with the driven pulley, and when the fixing ring is not fixed, the introduction ring in the pivoted state may return to an original state thereof so that the pawls are caught by the one-side teeth or the opposite-side teeth of the driven pulley, thereby causing the ring gear connector or the sun gear connector to be rotated together with the driven pulley.

The automatic transmission may further include a shifting lever provided on a handle, the regulator may include a regulating shaft rotatably connected to both the one-side plate and the opposite-side plate and configured to cause the one end of each of the stoppers to be spaced apart from or to be brought into contact with a corresponding one of the fixing rings depending on whether pressure is applied to the other end of the stopper or whether the pressure is released via rotation thereof, and a winding device connected to the shifting lever via a wire and configured to enable the regulating shaft to be rotated in a forward direction or in a reverse direction via rotation thereof caused by an operation of the shifting lever, the regulating shaft may be formed in a surface thereof with a pair of introduction recesses, into which the other ends of the stoppers are introduced, and the introduction recesses may not be formed on a same line in a longitudinal direction of the regulating shaft and are configured to prevent the other ends of the stoppers from being introduced thereinto at the same time, and, when the other ends of the stoppers are not introduced into the introduction recesses, the stoppers may be spaced apart from the respective fixing rings, thereby causing the ring gear connector and the sun gear connector to be rotated together with the driven pulley, and, when the other end of any one of the stoppers is introduced into a corresponding one of the introduction recesses, the stopper may be caught by a corresponding one of the fixing rings so that a corresponding one of the ring gear connector and the sun gear connector is rotated together with the driven pulley, and the remaining gear connector is not rotated together with the driven pulley.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
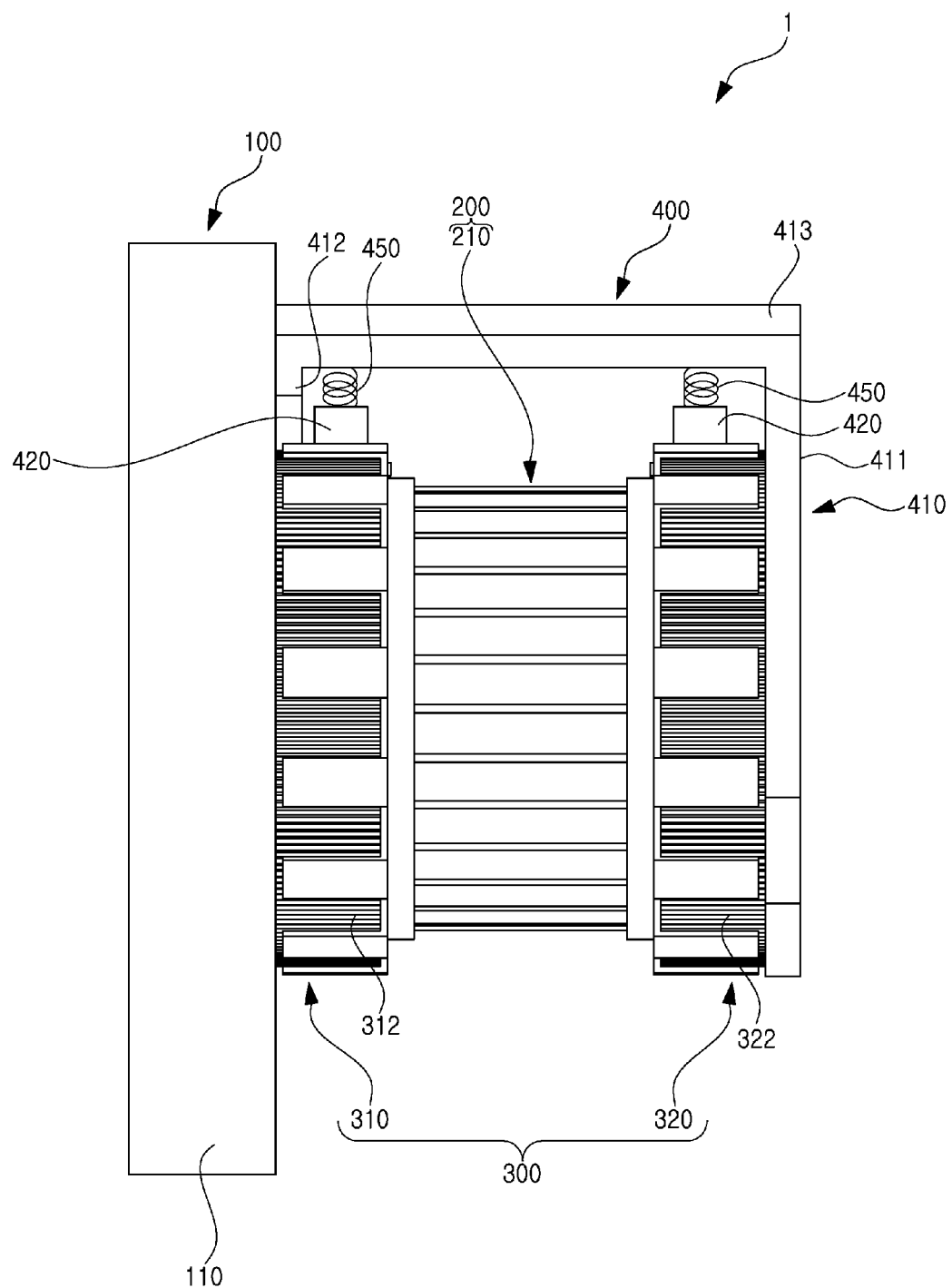
FIG. 1 is a front view illustrating an automatic transmission according to the present invention.

Reference will now be made in detail to the exemplary embodiments of the present invention, examples of which are illustrated in the accompanying drawings.

Referring to FIGS. 1 to 11, an automatic transmission according to the present invention, designated by reference numeral 1, includes a shifting unit 100, which is connected to wheels 11 of an installation target object and transmits rotational force thereto to shift gears, a drive unit 200, which is rotated by the rotational force transmitted from the outside, a connection unit 300, which causes the rotational force of the drive unit 200 to be transmitted to the shifting unit 100, and a regulation unit 400, which controls the connection unit 300 to enable gearshifting in the shifting unit 100.

Figure 2:
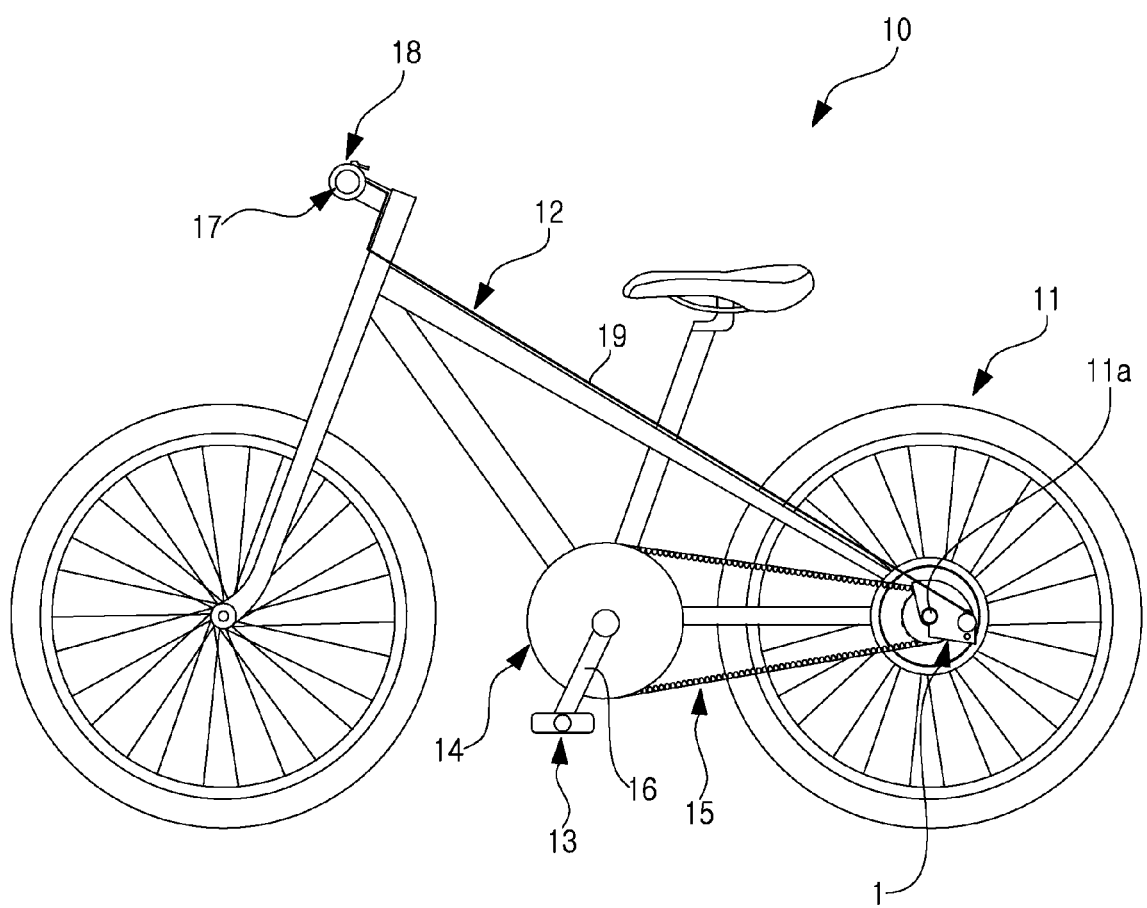
FIG. 2 is a side view illustrating a bicycle, to which the automatic transmission according to the present invention is coupled.

The installation target object, as illustrated in FIG. 2, may be a bicycle 10 having the wheels 11. The automatic transmission 1 is connected to the wheels 11 of the bicycle 10 to allow the rotational speed of the wheels 11, in other words, the traveling speed, to be changed by gearshifting.

Each of the wheels 11 may include a rotating shaft 11a, and may further include a rotating plate 11b, which is coupled around the rotating shaft 11a so as to be disposed on the other side of the wheel 11, and which serves to transmit the rotational force to the wheel 11 in cooperation with the rotating shaft 11a. The rotating plate 11b is provided with a plurality of rotating protrusions 11c.

Here, the other side of the wheel 11 may be understood as the right side when viewing the bicycle 10 from the front side.

The rotating plate 11b may be connected to the rotating shaft 11a so as to be rotatable in a given direction together with the rotating shaft 11a.

Accordingly, the rotating plate 11b is configured to transmit the rotational force only when rotating in a forward direction. With the forward rotation, the rotating plate 11b is rotated together with the rotating shaft 11a. On the other hand, the rotating plate 11b is not rotated together with the rotating shaft 11a when rotating in a reverse direction. Here, the forward rotation of the rotating plate 11b may be understood as rotation by which the bicycle 10 moves forwards, and the reverse rotation thereof may be understood as rotation by which the bicycle 10 moves backwards.

The rotating shaft 11a is rotatably coupled to a body frame 12, which constitutes the bicycle 10, and enables the wheel 11 to be rotated.

Figure 4:
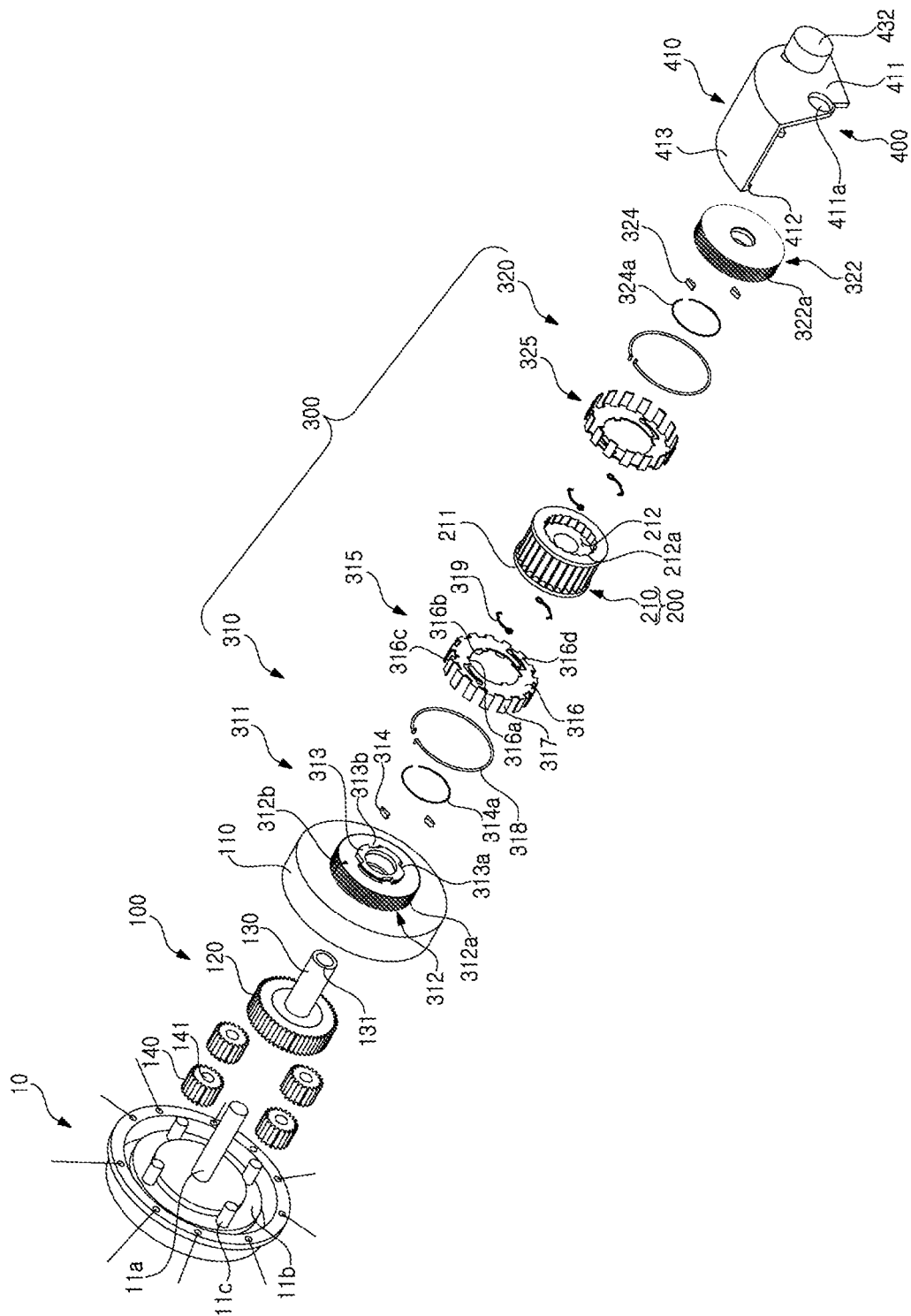
FIG. 4 is an exploded perspective view illustrating the automatic transmission according to the present invention.

The shifting unit 100, as illustrated in FIG. 2 or 4, is coupled to the other side of the wheel 11, and transmits the rotational force to the wheel 11.

Figure 5:
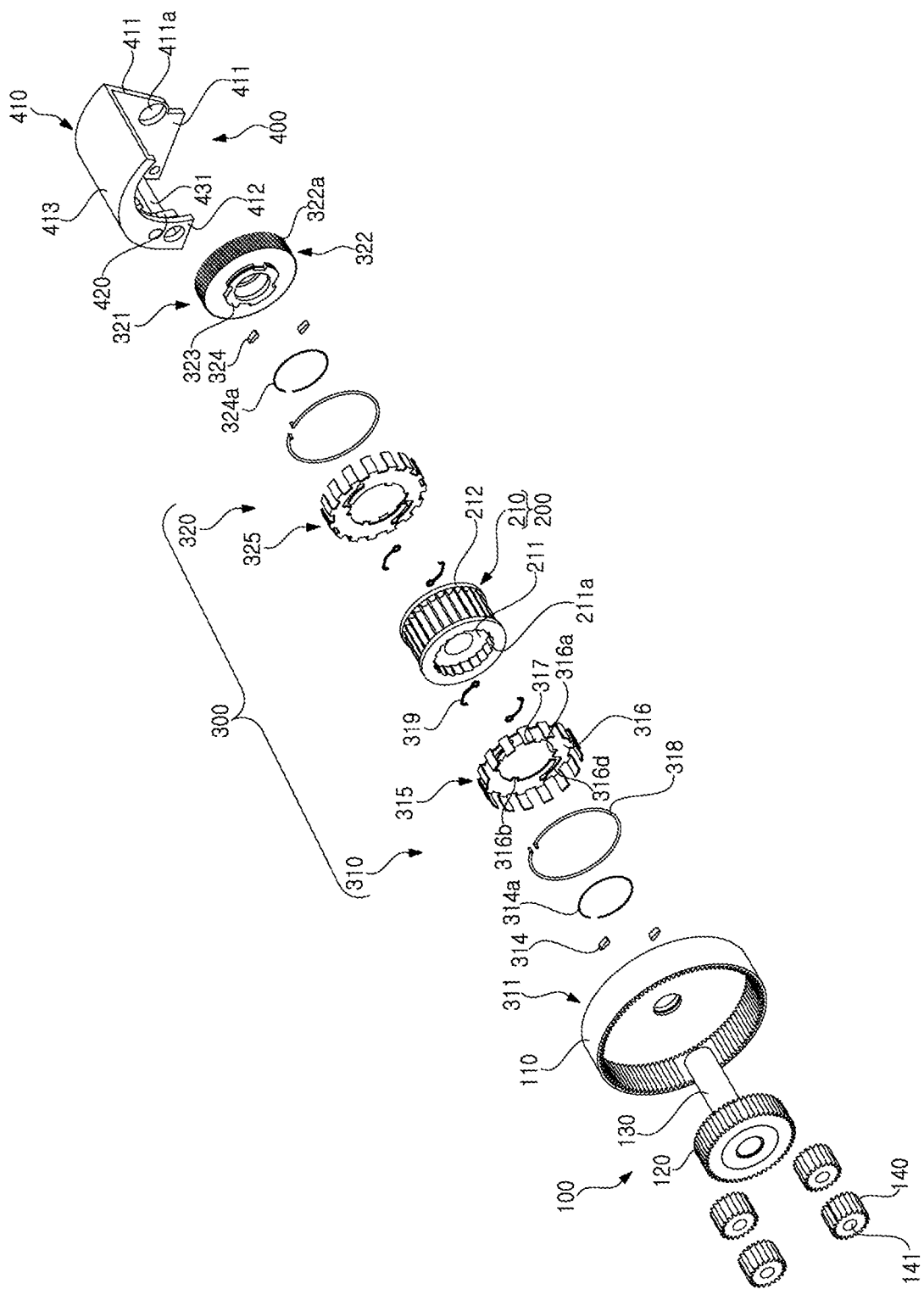
FIG. 5 is a rear exploded perspective view illustrating the automatic transmission according to the present invention.
Figure 6:
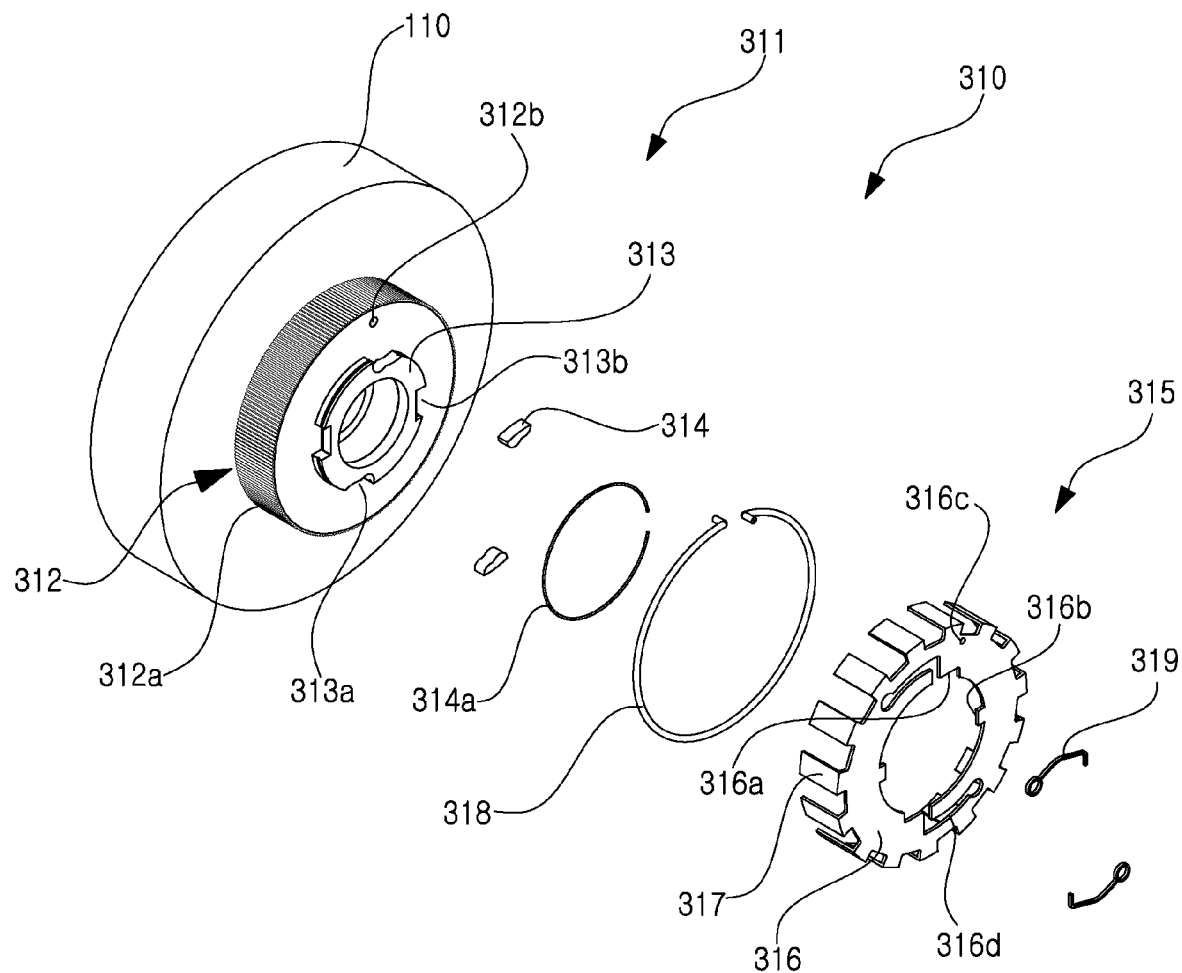
FIG. 6 is an exploded perspective view illustrating a ring gear connector in the automatic transmission according to the present invention.

The shifting unit 100, as illustrated in FIGS. 4 and 5, includes a ring gear 110, which is fitted and coupled around the rotating shaft 11a, the ring gear 110 having an open side so that the rotating protrusions 11c are accommodated therein, a sun gear 120, which is accommodated inside the ring gear 110, a drive shaft 130, which has one end connected to the sun gear 120 and the other end penetrating the other side of the ring gear 110, and a plurality of planetary gears 140, which are tooth-engaged between the ring gear 110 and the sun gear 120.

In a general configuration, the ring gear 110 is formed with teeth along the inner periphery thereof, and the sun gear 120 and the planetary gears 140 are formed with teeth along the outer periphery thereof.

The planetary gears 140 are provided in the same number as the number of rotating protrusions 11c, and each of the planetary gears 140 is formed with a gear fixing hole 141, which is open to opposite sides thereof, so that a corresponding one of the rotating protrusions 11c is rotatably coupled into the gear fixing hole 141.

The drive shaft 130 is formed with a shaft fixing hole 131, which penetrates therethrough in a longitudinal direction, and is coupled to the rotating shaft 11a.

In the automatic transmission 1, the connection unit 300 may be controlled by the regulation of the regulation unit 400 so that at least one gear among the ring gear 110 and the sun gear 120 is rotated to realize gearshifting, whereby the automatic transmission 1 enables the rotational speed of the wheels 11 to be changed.

That is, the automatic transmission 1 may shift to a first gear when the rotational force is transmitted to the wheels 11 via rotation of the sun gear 120, may shift to a second gear when the rotational force is transmitted to the wheels 11 via rotation of the ring gear 110, and may shift to a third gear when the rotational force is transmitted to the wheels 11 via rotation of both the ring gear 110 and the sun gear 120.

Figure 3:
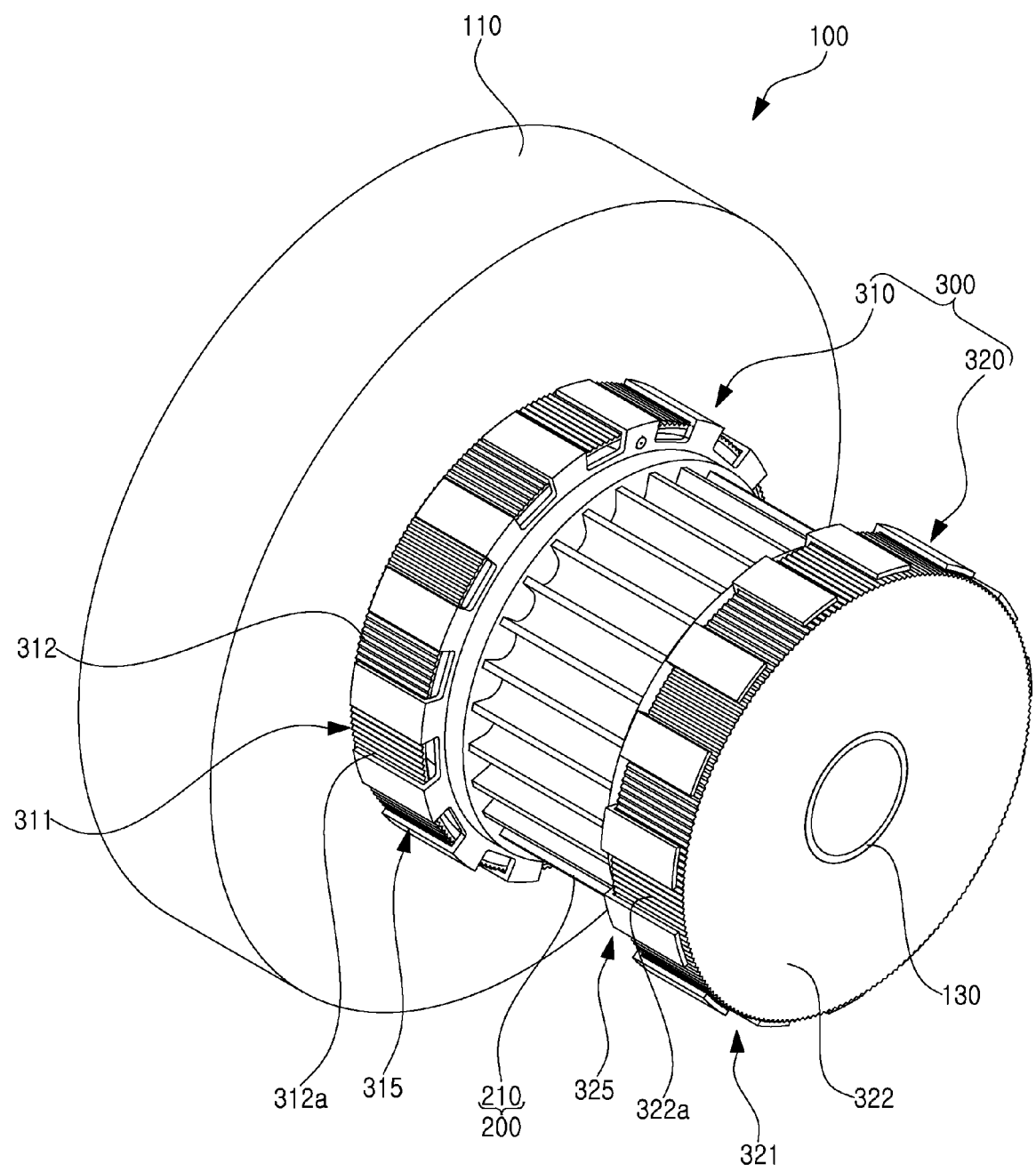
FIG. 3 is a perspective view illustrating the automatic transmission according to the present invention.

The drive unit 200, as illustrated in FIGS. 3 to 5, includes a driven pulley 210, which is rotatably coupled around the drive shaft 130.

The driven pulley 210, as illustrated in FIG. 2, is connected to a driving pulley 14, which is connected to a pedal 13 of the bicycle 10, in other words, a pedal crank 16, via a belt 15, so as to receive rotational force.

The belt 15 is most preferably a timing belt.

The connection unit 300, as illustrated in FIG. 1 or 3, includes a ring gear connector 310, which is coupled to the drive shaft 130 so as to be located on one side of the driven pulley 210 and is also connected to the ring gear 110 so as to be rotated together with the ring gear 110, and a sun gear connector 320, which is coupled to the drive shaft 130 so as to be located on the other side of the driven pulley 210 and is also connected to the drive shaft 130 so as to be rotated together with the sun gear 120.

The driven pulley 210, as illustrated in FIGS. 4 and 5, is formed with a one-side groove 211 and an opposite-side groove 212, which are indented inward from opposite sides thereof and are formed respectively on the inner circumferential surfaces thereof with one-side teeth 211a and opposite-side teeth 212a.

The ring gear connector 310 includes a fixing ring 312, an introduction ring 313, a first rotator 311, and a first lock 315. The fixing ring 312 is provided on the other side of the ring gear 110, and is formed on the outer circumferential surface thereof with a plurality of anti-rotation protrusions 312a. The introduction ring 313 extends from the inner circumferential surface of the fixing ring 312 in an opposite direction so as to be introduced into the one-side groove 211. The first rotator 311 includes a plurality of pawls 314, which are pivotably coupled around the introduction ring 313, and cause the ring gear connector 310 to be rotated together with the driven pulley 210 when caught by the one-side teeth 211a, or prevent the ring gear connector 310 from being rotated together with the driven pulley 210 when released from the one-side teeth 211a. The first lock 315 causes the pawls 314 to be folded or unfolded according to the control of the regulation unit 400.

The pawls 314 include a pair of pawls, and the introduction ring 313 is formed in the outer circumferential surface thereof with a pair of pawl insertion recesses 313a, into which the respective pawls 314 are inserted.

Figure 7:
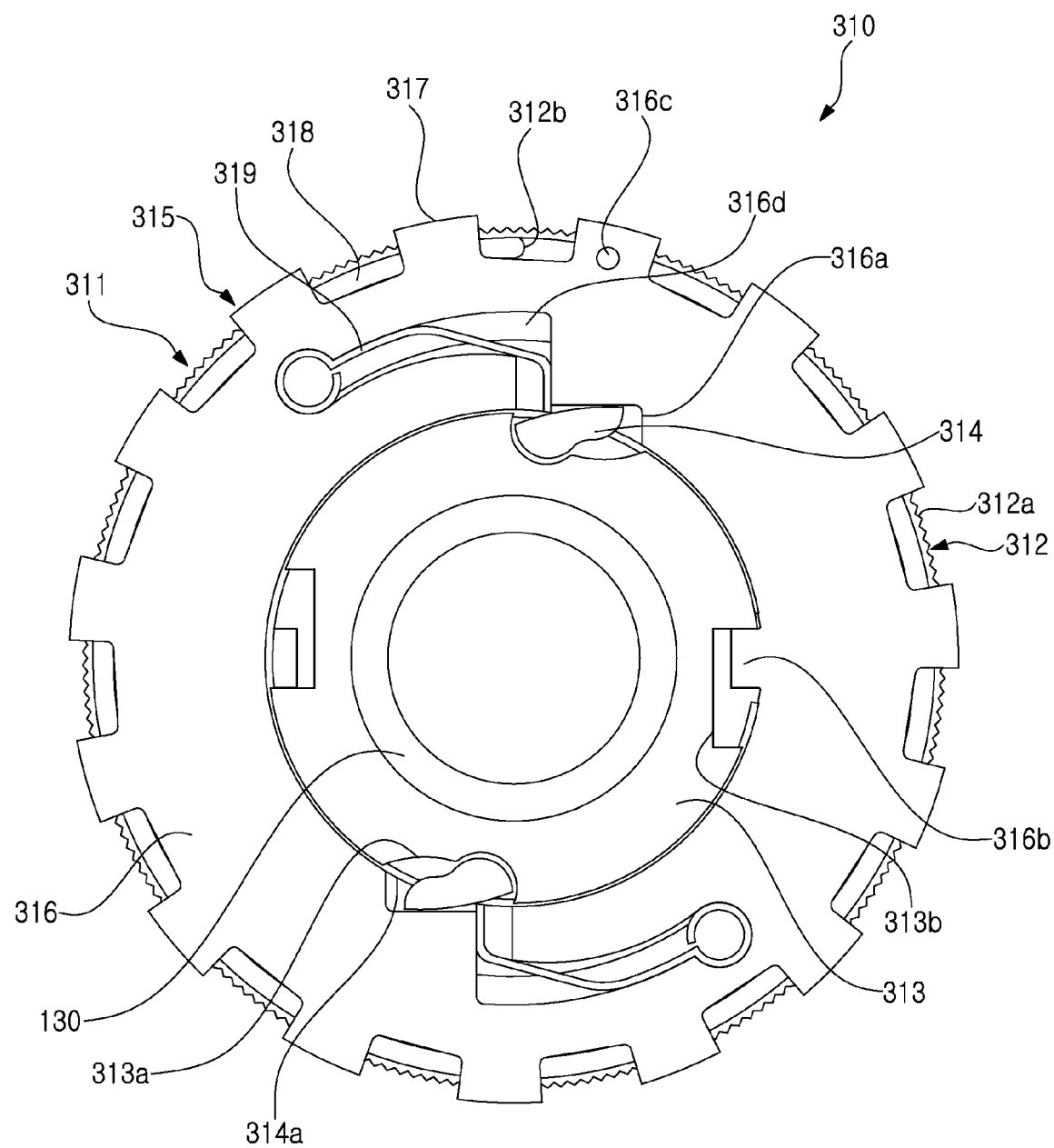
FIG. 7 is a side view illustrating the ring gear connector in the automatic transmission according to the present invention.

Each of the pawls 314, as illustrated in FIG. 7, is pivotably accommodated in a corresponding one of the pawl insertion recesses 313a to thereby be folded by an elastic member 314a, so as not to protrude outwards from the outer circumferential surface of the introduction ring 313, or is unfolded so as to protrude outwards from the outer circumferential surface of the introduction ring 313.

That is, in a normal unfolded state, the pawls 314 are caught by the one-side teeth 211a when the driven pulley 210 is rotated in the forward direction, thereby causing the ring gear connector 310 to be rotated together with the driven pulley 210.

In addition, when the driven pulley 210 is rotated in the reverse direction in the unfolded state of the pawls 314, the pawls 314 are folded by contact with the one-side teeth 211a, thereby preventing the ring gear connector 310 from being rotated together with the driven pulley 210.

Here, the forward rotation of the driven pulley 210 may be understood as rotation by which the bicycle 10 moves forwards, and the reverse rotation thereof may be understood as rotation by which the bicycle 10 moves backwards.

Thereby, the pawls 314 may prevent the ring gear connector 310 from being rotated in the reverse direction.

The pawls described above are already well known and used, and thus an additional detailed description thereof is omitted.

The first lock 315, as illustrated in FIGS. 4 to 7, includes a disc ring 316, which is coupled around the introduction ring 313 so as to come into contact with the fixing ring 312 and is formed with pawl accommodating recesses 316a, into which the respective pawls 314 are accommodated in the unfolded state, and a plurality of locking protrusions 317, which extend from the outer circumferential surface of the disc ring 316 in a direction so as to surround the fixing ring 312.

When the first rotator 311 is rotated in the inward direction of the first lock 315 and the pawls 314 are discharged from the pawl accommodating recesses 316a, the first lock 315 causes the pawls to be folded by coming into contact with the inner circumferential surface of the disc ring 316.

The ring gear connector 310 further includes an elastic ring 318, which has one end connected to the first rotator 311 and the other end connected to the first lock 315 and which is configured to return to the original state thereof by rotation of the first rotator 311.

When the first rotator 311 is rotated, on the basis of the state in which the pawls 314 are introduced into the pawl accommodating recesses 316a and are unfolded, this rotation may stop at the rotational angle at which the pawls 314 are capable of being discharged from the pawl accommodating recesses 316a and being folded. Here, needless to say, the rotation of the first rotator 311 may be conversely understood as rotation of the first lock 315 along the inner circumferential surface of the disc ring 316 in the state in which the first rotator 311 is fixed.

To this end, the introduction ring 313 may be formed in the inner circumferential surface thereof with a pair of guide grooves 313b, and the disc ring 316 may be formed on the inner circumferential surface thereof with a pair of guide protrusions 316b, which are introduced into the respective guide grooves 313b.

The guide protrusions 316b are configured to move in the longitudinal direction of the guide grooves 313b so as to allow the first rotator 311 to be rotated within a predetermined angular range.

The elastic ring 318 is formed of a wire, and has an opened ring shape, both ends of which are spaced apart from each other.

The fixing ring 312 is formed with a first fitting hole 312b, into which one end of the elastic ring 318 is fitted and coupled, and the disc ring 316 is formed with a second fitting hole 316c, into which the other end of the elastic ring 318 is fitted and coupled.

Both ends of the elastic ring 318 are bendable in opposite directions so as to be connected respectively to the first and second fitting holes 312b and 316c.

The first lock 315 may further include a pair of pressure members 319, which are provided on the disc ring 316 so as to be adjacent to the respective pawls 314 and serve to apply pressure to the pawls 314 when the first rotator 311 is rotated in order to ensure smooth folding of the pawls 314.

The disc ring 316 is formed in the inner circumferential surface thereof with a pair of embedding grooves 316d, which communicate with the inside of the disc ring 316 and are configured such that the pressure members 319 are introduced into and coupled into the respective embedding grooves 316d.

Each of the embedding grooves 316d, as illustrated in FIG. 7, has a "¬"-shaped form, and each of the pressure members 319 is formed of a leaf spring and has an approximately "¬"-shaped form, like the embedding groove 316d, so as to be coupled into the embedding groove 316d.

One end of the pressure member 319 protrudes in the inward direction of the disc ring 316 through the embedding groove 316d and is contracted by coming into contact with the pawl 314, thereby causing the pawl 314 to be folded.

The other end of the pressure member 319 is circularly rolled, thereby serving to prevent the pressure member 319 from being separated from the embedding groove 316d. The pressure member 319 may exert elastic force by being bent at multiple positions between the two ends thereof.

That is, the ring gear connector 310 causes the ring gear 110 to be rotated together with the driven pulley 210, or prevents the ring gear 110 from being rotated together with the driven pulley 210 depending on whether the pawls 314 are caught by or released from the one-side teeth 211a of the driven pulley 210 according to the control of the regulation unit 400.

In this way, the ring gear connector 310 may allow the rotational force of the drive unit 200 to be transmitted to the ring gear 110 or to be not transmitted to the ring gear 110 according to the control of the regulation unit 400.

Figure 8:
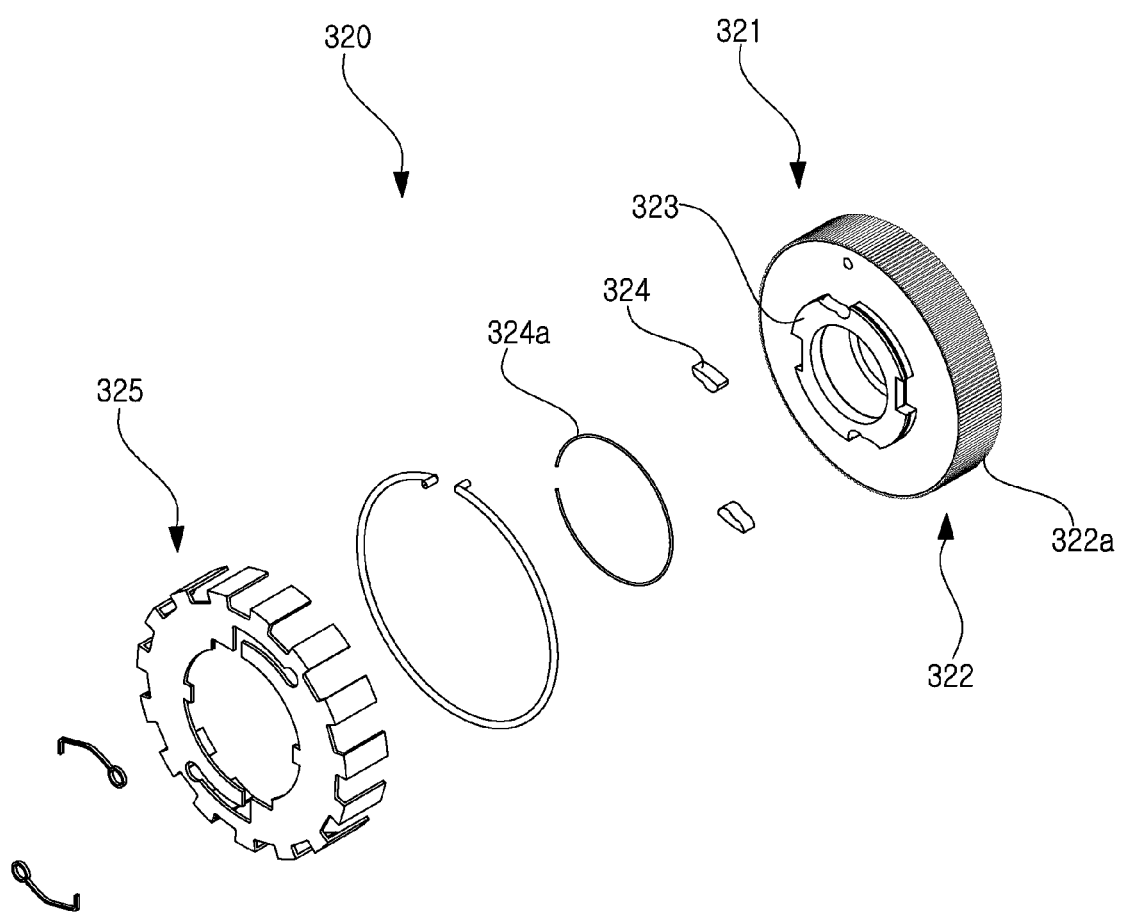
FIG. 8 is an exploded perspective view illustrating a sun gear connector in the automatic transmission according to the present invention.

The sun gear connector 320, as illustrated in FIGS. 4, 5 and 8, includes a fixing ring 322, an introduction ring 323, a second rotator 321, and a second lock 325. The fixing ring 322 is provided on the other side of the drive shaft 130, and is formed on the outer circumferential surface thereof with a plurality of anti-rotation protrusions 322a. The introduction ring 323 extends from the inner circumferential surface of the fixing ring 322 in an opposite direction so as to be introduced into the one-side groove 211. The second rotator 321 includes a plurality of pawls 324, which are pivotably coupled around the introduction ring 323, and cause the sun gear connector 320 to be rotated together with the driven pulley 210 when caught by the teeth 212a, or prevent the sun gear connector 320 from being rotated together with the driven pulley 210 when released from the teeth 212a. The second lock 325 causes the pawls 324 to be folded or unfolded according to the control of the regulation unit 400.

The second rotator 321 and the second lock 325 have the same shape as the first rotator 311 and the first lock 315 described above, and thus a detailed description thereof is omitted.

That is, the sun gear connector 320 is located at a position opposite the ring gear connector 310 about the driven pulley 210, and causes the sun gear 120 to be rotated together with the driven pulley 210 or prevents the sun gear 120 from being rotated with the driven pulley 210 depending on whether the pawls 324 are caught by or released from the teeth 212a of the driven pulley 210 according to the control of the regulation unit 400.

In this way, the sun gear connector 320 may allow the rotational force of the drive unit 200 to be transmitted to the sun gear 120 or to be not transmitted to the sun gear 120 according to the control of the regulation unit 400.

Figure 11:
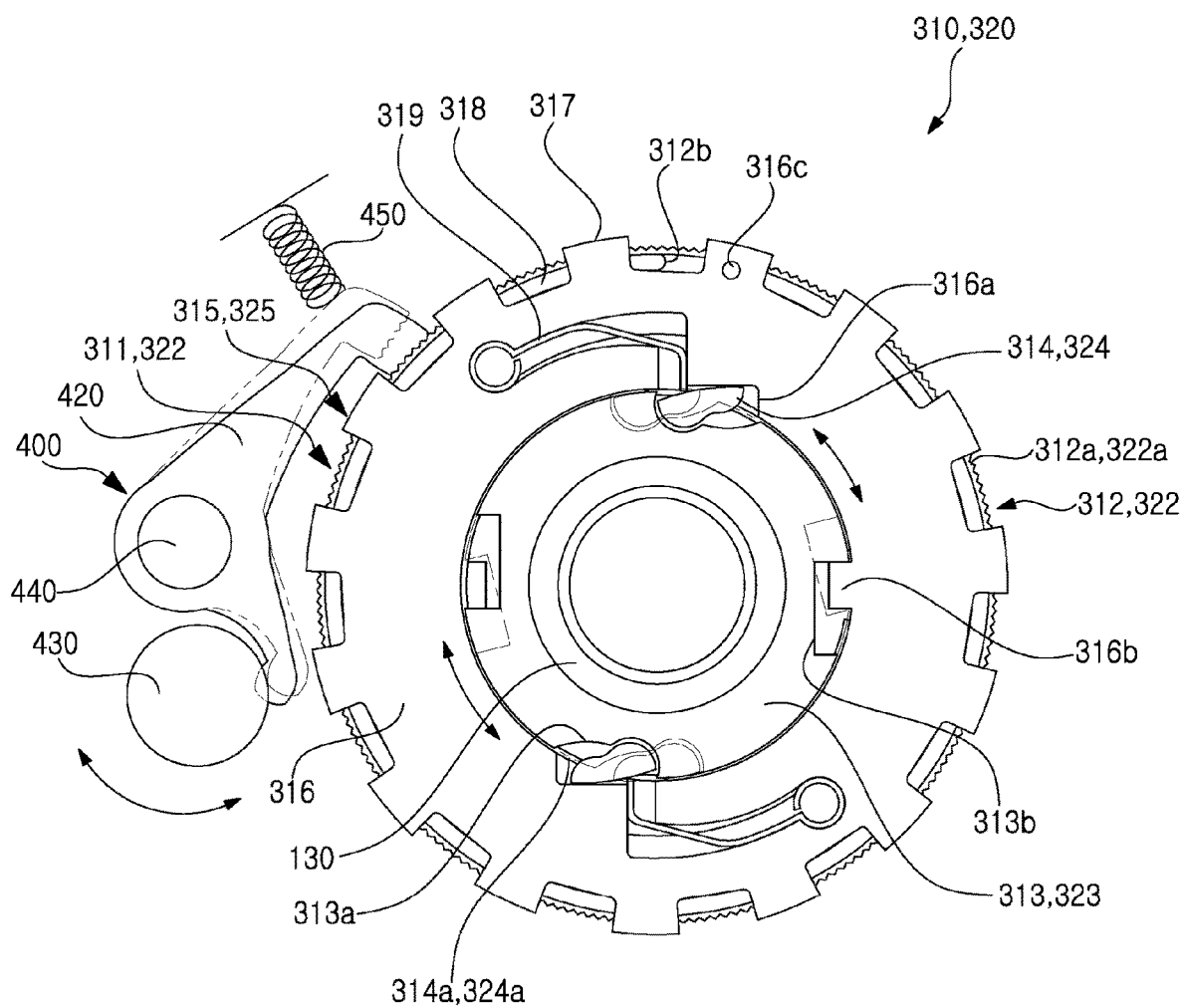
FIG. 11 is a view illustrating the operation of the ring gear connector and sun gear connector in the automatic transmission according to the present invention.

The regulation unit 400, as illustrated in FIG. 11, performs control to allow at least one of the ring gear connector 310 and the sun gear connector 320 to be rotated together with the driven pulley 210 via the folding and unfolding of the pawls 314 and 324, so as to cause the ring gear 110 or the sun gear 120 to be rotated, or to cause both the ring gear 110 and the sun gear 120 to be rotated at the same time, thereby enabling gearshifting.

Figure 9:
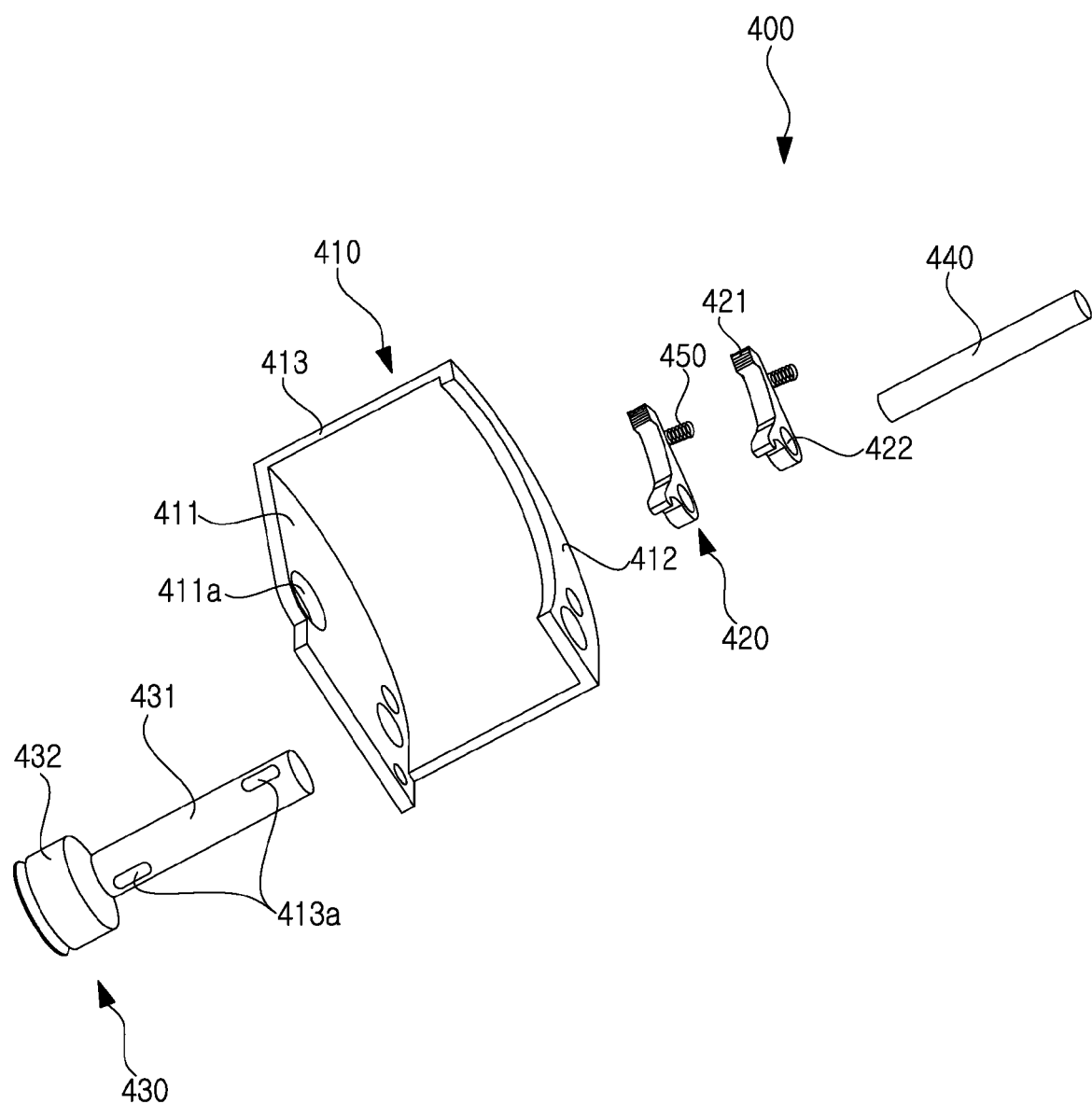
FIG. 9 is an exploded perspective view illustrating a regulation unit in the automatic transmission according to the present invention.
Figure 10:
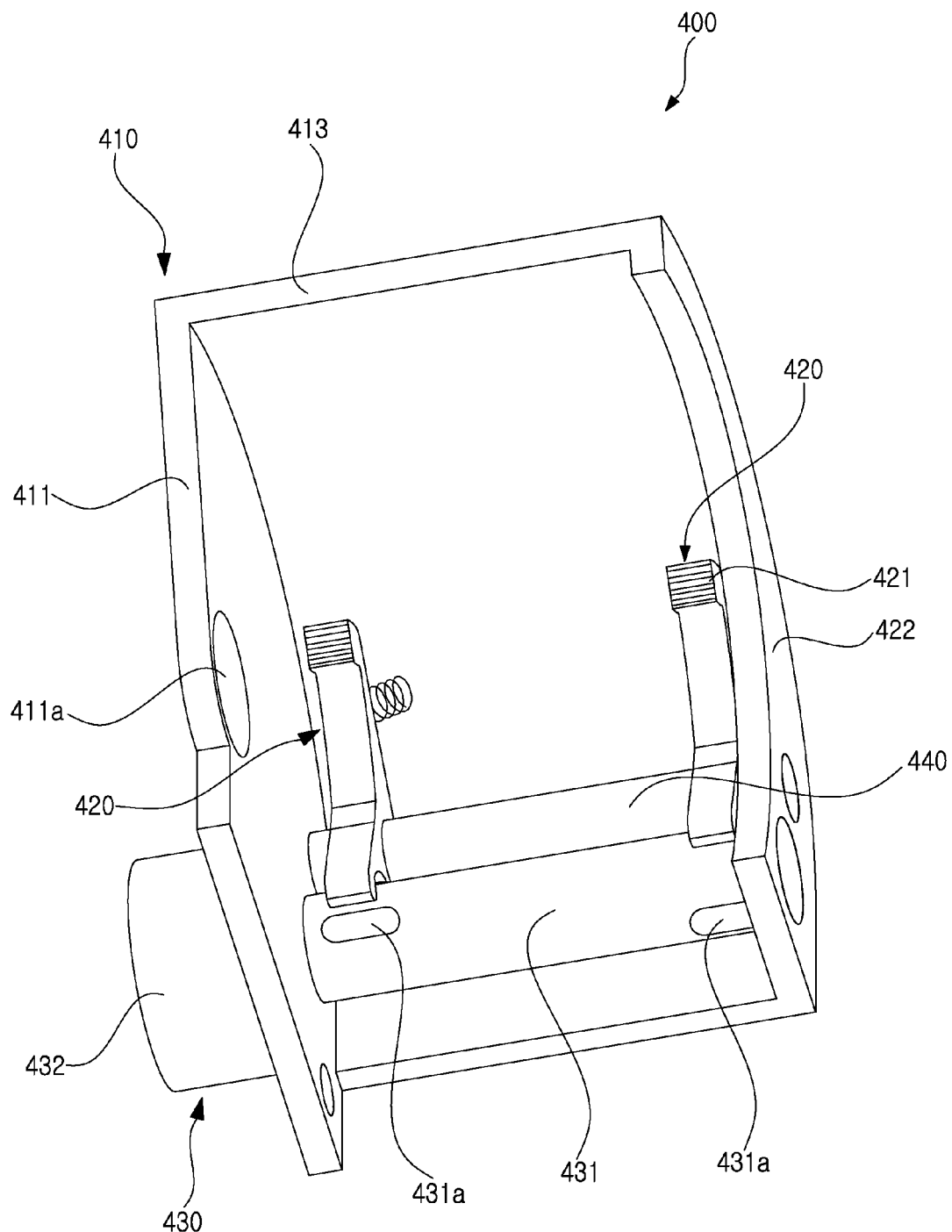
FIG. 10 is a perspective view illustrating the regulation unit in the automatic transmission according to the present invention.

To this end, the regulation unit 400, as illustrated in FIGS. 9 and 10, includes a support frame 410, which is coupled to the rotating shaft 11a so as to be adjacent to the connection unit 300, a pair of stoppers 420, which are pivotably connected to the support frame 410 and are caught by or released from the anti-rotation protrusions 312a and 322a via pivoting thereof so as to cause the ring gear connector 310 and the sun gear connector 320 to be rotated together with the driven pulley 210 or to prevent the ring gear connector 310 and the sun gear connector 320 from being rotated together with the driven pulley 210, and a regulator 430, which regulates the pivoting of the stoppers 420.

The support frame 410, as illustrated in FIGS. 1, 4 and 5, includes an opposite-side plate 411, which is located on the other side of the connection unit 300 and is formed with a shaft coupling hole 411a, into which the rotating shaft 11a is coupled, an one-side plate 412, which is disposed on the other side of the ring gear 110 so as to face the opposite-side plate 411, and a connecting plate 413, which interconnects both the plates 411 and 412.

The connecting plate 413 takes the form of a curved plate that extends along the connection unit 300. The one-side plate 412 is located at the outer side of the connection unit 300 and has a curved inner surface that is adjacent to the connection unit 300.

In this way, the support frame 410 is configured such that both the plates 411 and 412 and the connecting plate 413 are integrally connected to one another, and has a "⊏"-shaped form to surround the rear side of the connection unit 300.

The regulation unit 400 further includes a fixing pin 440, which is connected to both the plates 411 and 412 and is pivotably connected to the stoppers 420.

The two stoppers 420, as illustrated in FIGS. 1 and 11, are pivotably connected to the fixing pin 440 so as to be adjacent to the respective fixing rings 312 and 322.

Each of the stoppers 420, as illustrated in FIGS. 9 to 11, has two ends, one of which is formed with a holding protrusion 421 that corresponds to the anti-rotation protrusions 312a or 322a, and the other one of which pivots as pressure is applied thereto by the regulator 430 or as the applied pressure is released, thereby causing the holding protrusion 421 to be caught by or released from the anti-rotation protrusions 312a or 322a. The stopper 420 further has a pin coupling hole 422 formed between the two ends thereof so that the fixing pin 440 is coupled into the pin coupling hole 422.

When one end of the stopper 420 is introduced between the locking protrusions 317, the holding protrusion 421 and the anti-rotation protrusions 312a or 322a are engaged with and caught by each other.

The regulation unit 400 may further include a spring 450 provided between each of the stoppers 420 and the connecting plate 413.

Specifically, a pair of springs 450 is provided respectively on the pair of stoppers 420. Each spring 450 pushes one end of a corresponding one of the stoppers 420 toward the fixing ring 312 or 322 so that the other end of the stopper 420 remains in contact with the regulator 430, and also causes the holding protrusion 421 to be smoothly caught by the anti-rotation protrusions 312a or 322a when pressure is applied by the regulator 430.

The regulator 430 includes a regulating shaft 431, which is rotatably connected to both the plates 411 and 412, and causes one end of each stopper 420 to be spaced apart from or to be brought into contact with the fixing ring 312 or 322 depending on whether pressure is applied to the other end of the stopper 420 or whether the pressure is released via rotation thereof, and a winding device 432, which enables the regulating shaft 431 to be rotated in the forward direction or in the reverse direction depending on whether pressure is applied from the outside or whether the pressure is released.

Here, it should be understood that the other ends of the two stoppers 420 remain in contact with the regulating shaft 431 due to the pressure applied by the spring 450.

The winding device 432 is connected to a shifting lever 18, which is disposed on a handle 17 of the bicycle 10, via a wire 19, and enables the regulating shaft 431 to be rotated in the forward direction or in the reverse direction depending on whether the wire 19 is pulled or loosened by the operation of the shifting lever 18.

The winding device described above may be configured with, for example, a known general spring device, and thus, a detailed description thereof is omitted.

In addition, the shifting lever may have a known general form as long as it can shift gears from a low speed to a high speed or from a high speed to a low speed.

The regulating shaft 431 is formed in the surface thereof with a pair of introduction recesses 431a, into which the other ends of the two stoppers 420 are introduced.

The introduction recesses 431a are not formed on the same line in the longitudinal direction of the regulating shaft 431, and prevent the other ends of the two stoppers 420 from being introduced thereinto at the same time.

That is, as illustrated in FIG. 10, in the state in which the other ends of the stoppers 420 are in contact with the regulating shaft 431, according to the rotation of the regulating shaft 431 caused by the operation of the shifting lever 18, the other ends of the two stoppers 420 may not be introduced at the same time into the respective introduction recesses 431a, or any one stopper may not be introduced into a corresponding one of the introduction recesses 431a when the other stopper is introduced into the other introduction recess 431a.

When the other ends of the two stoppers 420 are not introduced into the introduction recesses 431a, one ends of the stoppers 420 pivot toward the respective springs 450 about the fixing pin 440, thereby applying pressure to the springs 450, and at the same time, are spaced apart from the fixing rings 321 and 322. At this time, the ring gear connector 310 and the sun gear connector 320 may be rotated together with the driven pulley 210.

In addition, when the other end of any one of the two stoppers 420 is introduced into a corresponding one of the introduction recesses 431a according to the rotation of the regulating shaft 431 caused by the operation of the shifting lever 18, one end of the stopper 420 pivots in the direction opposite the spring 450 about the fixing pin 440, thus causing the spring 450 in the contracted state to be loosened. On the other hand, the holding protrusion 421 of the other stopper 420 is caught by the anti-rotation protrusions of a corresponding one of the fixing rings 321 and 322.

At this time, one of the ring gear connector 310 and the sun gear connector 320 is rotated together with the driven pulley 210, and the other gear connector is not rotated together with the driven pulley 210.

Due to this, the regulation unit 400 controls the connection unit 300, enabling gearshifting.

Now, a gearshifting method of the automatic transmission 1 will be described in detail with reference to FIGS. 1 to 11. When the automatic transmission 1 shifts to a first gear via the operation of the shifting lever 18, the regulating shaft 431 is rotated, so that the other end of one of the stoppers 420 is introduced into a corresponding one of the introduction recesses 431a and the holding protrusion 421 formed on one end of the stopper 420 is caught by the anti-rotation protrusion 312a formed on the fixing ring 312.

When the fixing ring 312 is fixed, the introduction ring 313 coupled therein is rotated by the length of the guide groove 313b by the force of the ring that serves to sustain rotation, whereby the pawls 314 are folded and are released from the one-side teeth 211a of the driven pulley 210.

At this time, it may be understood that, in the case in which the introduction ring 323 is in the pivoted state, the introduction ring 323 return to the original state thereof so that the pawls 324 are caught by the opposite-side teeth 212a of the driven pulley 210.

As the pawls 314 are released from the one-side teeth 211a of the driven pulley 210, the ring gear connector 310 is not rotated together with the driven pulley 210. On the other hand, the sun gear connector 320 is rotated together with the driven pulley 210, thus causing the sun gear 120 to be rotated.

In this way, the automatic transmission 1 may transmit the rotational force of the first gear to the wheels 11.

In addition, when the automatic transmission 1 shifts to a second gear, the regulating shaft 431 is rotated, so that the other end of one of the stoppers 420 is introduced into a corresponding one of the introduction recesses 431a, and the holding protrusion 421 formed on one end of the stopper 420 is caught by the anti-rotation protrusion 322a formed on the fixing ring 322.

When the fixing ring 322 is fixed, the introduction ring 323 coupled therein is rotated by the length of the guide groove 313b, whereby the pawls 324 are folded and are released from the opposite-side teeth 212a of the driven pulley 210. Here, it should be understood that the guide groove 313b is also formed in the introduction ring 323 since the introduction ring 323 has the same shape as the introduction ring 313.

At this time, it may be understood that, in the case in which the introduction ring 313 is in the rotated state, the introduction ring 313 returns to the original state thereof so that the pawls 314 are caught by the one-side teeth 211a of the driven pulley 210.

As the pawls 324 are released from the opposite-side teeth 212a of the driven pulley 210, the sun gear connector 320 is not rotated together with the driven pulley 210. On the other hand, the ring gear connector 310 is rotated together with the driven pulley 210, thus causing the ring gear 110 to be rotated.

In this way, the automatic transmission 1 may transmit the rotational force of the second gear to the wheels 11.

In addition, when the automatic transmission 1 shifts to a third gear, the regulating shaft 431 is rotated, so that the other ends of the two stoppers 420 are not introduced into the respective introduction recesses 431a at the same time, and one ends of the stoppers 420 are spaced apart from the fixing rings 312 and 322.

When the stoppers 420 are spaced apart from the fixing rings 312 and 322, the introduction rings 313 and 323 in the pivoted state return to the original state, and the pawls 314 and 324 are caught by the teeth 211a and 212a of the driven pulley 210.

When the pawls 314 and 324 are caught by the teeth 211a and 212a of the driven pulley 210, the ring gear connector 310 and the sun gear connector 320 may be rotated together with the driven pulley 211.

In this way, the automatic transmission 1 may transmit the rotational force of the third gear to the wheels 11.

As is apparent from the above description, according to the present invention, the automatic transmission 1 may smoothly perform gearshifting from a low speed to a high speed or from a high speed to a low speed.

The effects of the present invention are not limited to the effects as mentioned above, and other unmentioned objects will be clearly understood by those skilled in the art from the following claims.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bicycle with an automatic transmission provided on a wheel to perform gearshifting, the automatic transmission comprising:
    a shifting unit connected to the wheel to transmit a rotational force thereto and configured to perform gearshifting;
    a drive unit configured to be rotated by the rotational force transmitted from an outside;
    a connection unit configured to transmit the rotational force of the drive unit to the shifting unit; and
    a regulation unit configured to control the connection unit so as to cause the shifting unit to perform gearshifting,
    wherein the shifting unit comprises:
    a ring gear having an open side;
    a sun gear accommodated inside the ring gear;
    a drive shaft having one end connected to the sun gear and a remaining end penetrating a remaining side of the ring gear; and
    a plurality of planetary gears tooth-engaged between the ring gear and the sun gear, and
    wherein the wheel comprises:
    a rotating shaft rotatably coupled at an outer periphery thereof to the ring gear, the sun gear, and the drive shaft; and
    a rotating plate provided around the rotating shaft so as to be disposed on one side of the wheel, and configured to transmit the rotational force to the wheel in cooperation with the rotating shaft, the rotating plate being provided with a plurality of rotating protrusions so that the planetary gears are rotatably coupled around the respective rotating protrusions, wherein the drive unit comprises a driven pulley rotatably coupled around the drive shaft and connected to a driving pulley, which is connected to a pedal crank, via a belt, wherein the connection unit comprises:

a ring gear connector coupled to the drive shaft so as to be located on one side of the driven pulley and connected to the ring gear so as to be rotated together with the ring gear; and a sun gear connector coupled to the drive shaft so as to be located on a remaining side of the driven pulley and connected to the drive shaft so as to be rotated together with the sun gear, wherein the regulation unit controls at least one of the ring gear connector and the sun gear connector to be rotated so as to enable gearshifting by rotation of at least one of the ring gear and the sun gear, and wherein the shifting unit shifts to a first gear via rotation of the sun gear, shifts to a second gear via rotation of the ring gear, and shifts to a third gear via rotation of both the ring gear and the sun gear, so as to transmit the rotational force to the wheel.

2. The bicycle according to claim 1, wherein the driven pulley is formed with a one-side groove and an opposite-side groove, which are indented inward from opposite sides thereof and are formed respectively on inner circumferential surfaces thereof with one-side teeth and opposite-side teeth, wherein the ring gear connector comprises: a fixing ring provided on the remaining side of the ring gear and formed on an outer circumferential surface thereof with a plurality of anti-rotation protrusions; an introduction ring configured to extend from an inner circumferential surface of the fixing ring in an opposite direction so as to be introduced into the one-side groove; a first rotator comprising a plurality of pawls pivotably coupled around the introduction ring and configured to cause the ring gear connector to be rotated together with the driven pulley when caught by the one-side teeth, or to prevent the ring gear connector from being rotated together with the driven pulley when released from the one-side teeth; and a first lock configured to cause the pawls to be folded or unfolded according to control of the regulation unit, and wherein the sun gear connector comprises: a fixing ring provided on one side of the drive shaft and formed on an outer circumferential surface thereof with a plurality of anti-rotation protrusions; an introduction ring configured to extend from an inner circumferential surface of the fixing ring in an opposite direction so as to be introduced into the one-side groove; a second rotator comprising a plurality of pawls pivotably coupled around the introduction ring and configured to cause the sun gear connector to be rotated together with the driven pulley when caught by the opposite-side teeth, or to prevent the sun gear connector from being rotated together with the driven pulley when released from the opposite-side teeth; and a second lock configured to cause the pawls to be folded or unfolded according to control of the regulation unit.

3. The bicycle according to claim 2, wherein each of the first and second locks comprises:

a disc ring coupled around a corresponding one of the introduction rings so as to come into contact with a corresponding one of the fixing rings and formed with pawl accommodating recesses, into which the respective pawls are accommodated in an unfolded state; and a plurality of locking protrusions configured to extend from an outer circumferential surface of the disc ring in a direction so as to surround the fixing ring, and wherein, when the first or second rotator is rotated in an inward direction of the first or second lock and the pawls are discharged from the pawl accommodating recesses, the first or second lock causes the pawls to be folded by coming into contact with an inner circumferential surface of the disc ring.

4. The bicycle according to claim 3, wherein each of the ring gear connector and the sun gear connector further comprises an elastic ring, which comprises one end connected to the first or second rotator and a remaining end connected to the first or second lock and which is configured to return to an original state thereof by rotation of the first or second rotator, wherein each of the introduction rings is formed in an inner circumferential surface thereof with a pair of guide grooves, and the disc ring is formed on the inner circumferential surface thereof with a pair of guide protrusions, which are introduced into the respective guide grooves, and wherein each of the first and second locks further comprises a pair of pressure members provided on the disc ring so as to be adjacent to the pawls and configured to apply pressure to the pawls when the first or second rotator is rotated in order to ensure smooth folding of the pawls.

5. The bicycle according to claim 2, wherein the regulation unit comprises:

a support frame disposed so as to be adjacent to the connection unit;

a pair of stoppers pivotably connected to the support frame and configured to be caught by or released from the anti-rotation protrusions via pivoting thereof so as to cause the ring gear connector and the sun gear connector to be rotated together with the driven pulley or to prevent the ring gear connector and the sun gear connector from being rotated together with the driven pulley; and a regulator configured to regulate the pivoting of the stoppers.

6. The bicycle according to claim 5, wherein the support frame comprises:

an opposite-side plate located on one side of the connection unit and formed with a shaft coupling hole, into which the rotating shaft is coupled;

an one-side plate disposed on the remaining side of the ring gear so as to face the opposite-side plate; and a connecting plate configured to interconnect the opposite-side plate and the one-side plate and disposed at an outer side of the ring gear connector and the sun gear connector, wherein the regulation unit further comprises:

a fixing pin connected to the opposite-side plate and the one-side plate so that the stoppers are pivotably connected to the fixing pin; and a spring provided between the stopper and the connecting plate, wherein each of the stoppers is formed on one end thereof with a holding protrusion that corresponds to the anti-rotation protrusions, a portion of the stopper between the one end and a remaining end is pivotably connected to the fixing pin so as to be adjacent to a corresponding one of the fixing rings, and the one end of the stopper pivots about the fixing pin as pressure is applied to the remaining end of the stopper by the regulator or as the applied pressure is released, so that the holding protrusion is caught by or released from the anti-rotation protrusions to enable control of rotation of the fixing ring, and wherein, when the fixing ring of the ring gear connector or the sun gear connector is fixed, the introduction ring coupled therein is rotated by a predetermined angle so that the pawls are folded and are released from the one-side teeth or the opposite-side teeth of the driven pulley, thereby preventing the ring gear connector or the sun gear connector from being rotated together with the driven pulley, and when the fixing ring is not fixed, the introduction ring in the pivoted state returns to an original state thereof so that the pawls are caught by the one-side teeth or the opposite-side teeth of the driven pulley, thereby causing the ring gear connector or the sun gear connector to be rotated together with the driven pulley.

7. The bicycle according to claim 6, further comprising a shifting lever provided on a handle, wherein the regulator comprises:

a regulating shaft rotatably connected to both the one-side plate and the opposite-side plate and configured to cause the one end of each of the stoppers to be spaced apart from or to be brought into contact with a corresponding one of the fixing rings depending on whether pressure is applied to the other end of the stopper or whether the pressure is released via rotation thereof; and a winding device connected to the shifting lever via a wire and configured to enable the regulating shaft to be rotated in a forward direction or in a reverse direction via rotation thereof caused by an operation of the shifting lever, wherein the regulating shaft is formed in a surface thereof with a pair of introduction recesses, into which the other ends of the stoppers are introduced, and the introduction recesses are not formed on a same line in a longitudinal direction of the regulating shaft and are configured to prevent the other ends of the stoppers from being introduced thereinto at the same time, and wherein, when the other ends of the stoppers are not introduced into the introduction recesses, the stoppers are spaced apart from the respective fixing rings, thereby causing the ring gear connector and the sun gear connector to be rotated together with the driven pulley, and, when the other end of any one of the stoppers is introduced into a corresponding one of the introduction recesses, the stopper is caught by a corresponding one of the fixing rings so that a corresponding one of the ring gear connector and the sun gear connector is rotated together with the driven pulley, and the remaining gear connector is not rotated together with the driven pulley.

\* \* \* \* \*